(12) United States Patent
Fuchs et al.

(10) Patent No.: US 11,435,210 B2
(45) Date of Patent: Sep. 6, 2022

(54) FLUID METER AND FLUID MEASURING MODULE FOR A FLUID MEASURING DEVICE AND ASSEMBLY

(71) Applicants: Buerkert Werke GmbH & Co. KG, Ingelfingen (DE); Burkert S.A.S., Triembach-au-Val (FR)

(72) Inventors: Yannick Fuchs, Ingelfingen (DE); Bertrand Koenig, Ingelfingen (DE); Noam Nancy, Ingelfingen (DE); Manon Drui, Ingelfingen (DE)

(73) Assignees: BUERKERT WERKE GMBH & CO. KG, Ingelfingen (DE); BURKERT S.A.S., Triembachau-Val (FR)

( * ) Notice: Subject to any disclaimer, the term of this patent is extended or adjusted under 35 U.S.C. 154(b) by 565 days.

(21) Appl. No.: 16/426,058

(22) Filed: May 30, 2019

(65) Prior Publication Data
US 2019/0368907 A1    Dec. 5, 2019

(30) Foreign Application Priority Data

May 30, 2018    (FR) ........................................ 1854646
May 10, 2019    (DE) ..................... 10 2019 112 332.1

(51) Int. Cl.
*G01F 1/66* (2022.01)
*G01N 29/22* (2006.01)
(Continued)

(52) U.S. Cl.
CPC .............. *G01F 1/662* (2013.01); *G01F 1/667* (2013.01); *G01F 1/74* (2013.01); *G01F 15/14* (2013.01);
(Continued)

(58) Field of Classification Search
CPC . G01F 1/662; G01F 1/667; G01F 1/74; G01F 15/14; G01N 29/02; G01N 29/221; G01N 29/222; G01N 29/223
See application file for complete search history.

(56) References Cited

U.S. PATENT DOCUMENTS

| | | | |
|---|---|---|---|
| 2004/0011141 A1* | 1/2004 | Lynnworth | G01F 1/662 73/861.27 |
| 2004/0123666 A1* | 7/2004 | Ao | G01N 29/024 73/644 |

(Continued)

FOREIGN PATENT DOCUMENTS

| | | |
|---|---|---|
| WO | 2008034878 A2 | 3/2008 |
| WO | 2017125612 A1 | 7/2017 |

*Primary Examiner* — Benjamin R Schmitt
(74) *Attorney, Agent, or Firm* — Dilworth IP, LLC

(57) ABSTRACT

A fluid meter has a housing comprising a flow channel for fluid to be measured and at least one elongate module-receiving opening forming a passage from an outer surface of the housing to the flow channel. At least one fluid-measuring module, prefabricated separately, from the housing with a base section formed as a waveguide for surface acoustic waves, and at least one signal transformer to excite surface acoustic waves in the waveguide and/or receive surface acoustic waves from the waveguide is provided. When inserted into the module-receiving opening, the base section of the fluid-measuring module forms part of the flow channel inner wall and contacts fluid flowing through it. Surface acoustic waves emitted by the signal transformer can be coupled out of the waveguide and can propagate through fluid in the flow channel as bulk acoustic waves and/or bulk acoustic waves can be coupled into the waveguide and received by the signal transformer.

18 Claims, 10 Drawing Sheets

(51) Int. Cl.
*G05D 7/00* (2006.01)
*G01F 1/667* (2022.01)
*G01F 1/74* (2006.01)
*G01F 15/14* (2006.01)

(52) U.S. Cl.
CPC ......... *G01N 29/221* (2013.01); *G01N 29/222* (2013.01); *G05D 7/005* (2013.01)

(56) References Cited

U.S. PATENT DOCUMENTS

| | | |
|---|---|---|
| 2005/0072217 A1 | 4/2005 | Discenzo |
| 2011/0079090 A1* | 4/2011 | Kroemer ................. G01F 1/662 73/861.25 |
| 2011/0271769 A1* | 11/2011 | Kippersund .............. G01F 1/42 73/861.28 |
| 2012/0060591 A1 | 3/2012 | Faustmann et al. |
| 2012/0191382 A1* | 7/2012 | Nakabayashi .......... G01F 1/662 702/48 |
| 2014/0360270 A1* | 12/2014 | Koenig ................ G01N 29/022 73/597 |
| 2019/0025101 A1 | 1/2019 | Rautenberg |
| 2019/0226893 A1* | 7/2019 | Kuhlemann ............ G01F 1/662 |

* cited by examiner

Fig. 15
Fig. 16
Fig. 17
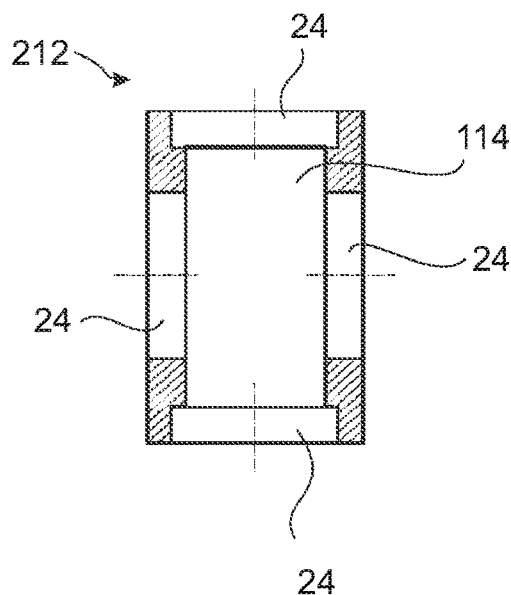
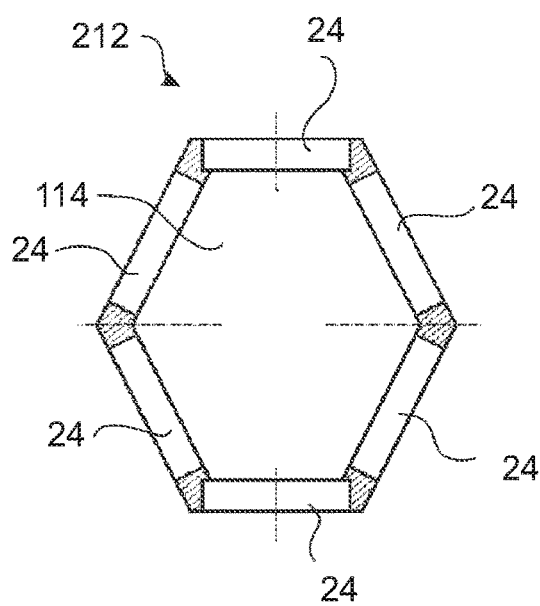
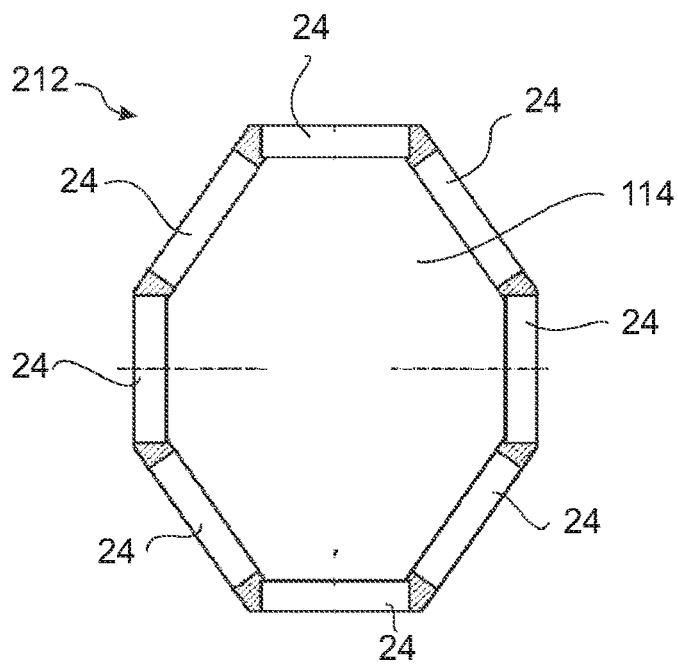

FLUID METER AND FLUID MEASURING MODULE FOR A FLUID MEASURING DEVICE AND ASSEMBLY

FIELD OF THE INVENTION

The invention relates to a fluid meter and a fluid-measuring module for a fluid meter as well as a subassembly consisting of a housing of a fluid meter and a fluid-measuring module.

BACKGROUND OF THE INVENTION

In many systems, it is necessary to determine a flow of a fluid. Often, it is also advantageous to be able to determine other properties of the fluid flowing through the system. For this purpose, fluid meters, thus devices by means of which a flow or also other properties of the flowing fluid can be measured, are inserted into one of the fluid lines of the system.

The fluid meter used should be designed as compact and robust as possible, thus should require little installation space and be largely maintenance-free. Moreover, it is advantageous if the fluid meter is as universally usable as possible and in particular if different fluids can be used or also different properties can be determined.

A measurement method which is well-suited to such a task is the use of surface acoustic waves, which are excited in an acoustic waveguide and are in part coupled out into the fluid and from there coupled into the waveguide again. For this measurement method, the fluid is in direct contact with the waveguide. The type and frequency of the surface waves is chosen such that a partial coupling-out into the fluid as longitudinal bulk acoustic waves is effected. These acoustic waves pass through the fluid and are reflected at a surface delimiting the fluid such that they strike the waveguide again. There, some of the bulk acoustic waves are coupled into the same or another waveguide again as surface acoustic waves and continue therein. In this way, a characteristic signal, the temporal intensity gradient of which, including the time lag relative to the signal emitted by the transmitter, allows conclusions as to the characteristic properties of the fluid, such as for example sound velocity, temperature, homogeneity, flow rate, flow, flow volume, density, composition of a multiphase flow, concentration or viscosity, is obtained at an acoustic receiver, which is arranged spaced apart from the transmitter on a waveguide.

This measurement method is suitable in particular for liquid, but also for highly viscous, doughy, gelatinous or paste-like fluids of homogeneous or inhomogeneous type, including biological samples. Use for gaseous fluids would also be conceivable, wherein in this case the sound velocities, which are clearly different from those of liquids, should be taken into account. When the fluid flows through the meter, temporal changes in the fluid can also be detected.

The spatial propagation of the bulk acoustic waves in the fluid is achieved e.g. in that the bulk acoustic waves are coupled out into the fluid at an angle $\delta$ relative to a surface normal of the waveguide. The relationship can be described by the following formula:

$$\delta = \arcsin\left(\frac{c_M}{c_S}\right),$$

wherein $c_M$ is the sound velocity of the bulk acoustic waves inside the fluid and $c_S$ is the sound velocity of the surface acoustic waves propagating along the waveguide.

In the case existing most frequently, in which the sound velocity in the fluid is lower than that of the surface waves in the waveguide, acoustic waves are coupled out at an angle different from zero, and the bulk acoustic waves, possibly with multiple reflections inside the fluid, cover a spatial distance along the waveguide.

In the known devices transmitter and receiver are secured on a side of the respective waveguide lying opposite the interface with the fluid. In order to be able to couple surface acoustic waves excited on this side of the waveguide into the fluid, therefore, Lamb waves are preferably excited, thus waves the wavelength of which is much longer than the thickness of the waveguide between transmitter and fluid. In this case, both the top and the bottom side of the waveguide move, wherein the oscillation also has a longitudinal component. This type of excitation is therefore suitable for coupling out bulk acoustic waves. It is also possible to choose the wavelength of the excited surface acoustic waves to be in the order of magnitude of the thickness of the waveguide, wherein surface waves are then excited in a transition area between Lamb waves and Rayleigh waves.

The devices previously described in the state of the art, which function according to the above-described principle, have a complex structure and are expensive to manufacture and maintain.

The object of the invention is to create a compact and robust, but still flexibly usable fluid meter based on the surface acoustic wave principle.

SUMMARY OF THE INVENTION

The invention provides a fluid meter having a housing, in which a flow channel for a flow channel for a fluid to be measured as well as at least one elongate module-receiving opening are formed, wherein the module-receiving opening forms a passage from an outer surface of the housing to the flow channel. The module-receiving opening is aligned along the flow channel. Moreover, the fluid meter comprises at least one fluid-measuring module, prefabricated separately from the housing, which has a base section formed as a waveguide for surface acoustic waves, as well as at least one signal transformer, which is designed to excite surface acoustic waves in the waveguide and/or to receive surface acoustic waves from the waveguide. The fluid-measuring module is inserted into the module-receiving opening such that the base section of the fluid-measuring module forms a section of an inner wall of the flow channel which comes into direct contact with the fluid flowing through it, with the result that surface acoustic waves emitted by the signal transformer can be coupled out of the waveguide and can propagate through the fluid in the flow channel as bulk acoustic waves and/or bulk acoustic waves can be coupled into the waveguide and received by the signal transformer.

Because of the modular construction, the fluid-measuring module can be manufactured separately from the rest of the fluid meter and can easily be inserted into the module-receiving opening of the already completed housing from the outside as a completely prefabricated component. This simplifies the manufacture and also makes an easy exchange of the fluid-measuring module possible, whereby the service life of the fluid meter can be extended.

The waveguide can close a gap in the wall of the flow channel which exists in the housing. Thus, there is no need to form the entire flow channel by the waveguide of a single fluid-measuring module.

Moreover, advantageously apart from the waveguide, all the housing components of the fluid meter are provided in its housing, with the result that the fluid-measuring module can be reduced to the essential components needed for measurement with the fluid-measuring module. The fluid-measuring module is therefore also advantageously designed such that it can be used only together with the housing of the fluid meter and does not form an independent measuring device.

The inner wall of the flow channel, including the section formed by the waveguide, can be designed continuously smooth and formed completely from a material which is corrosion-resistant with regard to the fluid to be measured. The waveguide preferably always consists of the same material as the rest of the wall of the flow channel. Thus, a uniform surface results even if the waveguide is not a single-piece part of the housing of the fluid meter.

Of course, the fluid-measuring module should be sealed vis-à-vis the fluid along the circumference of the module receiver, with the result that in the area of the fluid-measuring module no fluid can inadvertently leak from the flow channel.

At the upstream and at the downstream end in each case the housing can have a securing structure, e.g. a flange, as is known from other fluid meters, via which the fluid meter can be connected to an adjoining section of a fluid line. The fluid meter can thus be easily and quickly integrated into an existing system.

The flow channel preferably runs along a flow direction of the fluid in a straight line and in particular forms a straight measurement section in particular in the area of the waveguide, in order to make it possible to measure with as much accuracy as possible.

The flow channel is formed closed in the circumferential direction around the flow direction. In general, it is provided that the fluid in a system flows on a predefined path through the fluid meter from a fluid inlet to a fluid outlet, without areas of the fluid meter that do not guide fluid coming into contact with the fluid.

In terms of manufacturing technology it is favourable to form the base section of the fluid-measuring module flat on its outer side facing the flow channel, which represents the interface with the fluid.

The shape of the cross section of the flow channel (seen in a plane perpendicular to the flow direction) in the area of the module-receiving opening can be chosen as desired, but a polygonal, in particular rectangular, square, hexagonal or octagonal cross section is preferred. This allows the waveguide to be designed on its outer side directed towards the flow channel as a flat surface which forms one of the polygon faces of the cross section of the flow channel.

It would also be conceivable to form the outer side of the waveguide directed towards the flow channel with a continuous curvature, but abrupt steps should be avoided.

The flow channel is normally delimited by a fluid inlet and by a fluid outlet, which can be connected to the securing structures on the housing. Elements for influencing the flow rate along the flow direction are preferably provided at the fluid inlet and/or at the fluid outlet. For example, a converging nozzle can be arranged at the fluid inlet and/or a diverging nozzle can be arranged at the fluid outlet, if the flow channel has a smaller cross section than the fluid inlet or fluid outlet, in order to increase the flow rate on entry into the flow channel or to reduce it again on exit from the flow channel. An increase in the flow rate is accompanied by an increase in the measurement accuracy in the case of low flows.

The fluid meter is preferably designed such that it is possible for fluid to flow through along the flow direction both from the fluid inlet to the fluid outlet and in the opposite direction, thus fluid inlet and fluid outlet can swap functions.

Perpendicular to the flow direction, the module-receiving opening can be a little wider than the fluid channel, with the result that in the transition from the fluid channel to the module-receiving opening a shoulder is formed, on which an edge of the base section can bear, and which can be used for arranging a seal between the fluid-measuring module and the flow channel.

In a preferred embodiment, at least one further module-receiving opening, which is preferably formed on a side of the flow channel lying opposite the first module-receiving opening, is provided in the housing.

In particular, a second fluid-measuring module can be inserted into the further module-receiving opening, wherein the position of the signal transformer in the two fluid-measuring modules along the flow direction of the flow channel advantageously differs. In this case, each of the fluid-measuring modules only needs to have a single signal transformer, wherein in each case one of the signal transformers functions as transmitter and the other functions as receiver. The functions are preferably implemented alternately, wherein transmitter and receiver swap roles according to a predefined plan.

In principle, however, any desired suitable number of signal transformers can be provided in each of the fluid-measuring modules.

A reflector, for example in the form of a waveguide, on which no signal transformer is arranged, could also be inserted into the further module-receiving opening.

In another variant, another measuring module, in particular an analysis module, for detecting further measurement variables can be received in the further module-receiving opening. Like the fluid module, the analysis module is also preferably a separately prefabricated component which merely has to be inserted into the module-receiving opening from the outside and fixed there for assembly on the fluid meter. The analysis module seals the respective module-receiving opening in a fluid-tight manner.

The analysis module can, for example, be designed to measure an electrical conductivity, a pH, a concentration of a chemical substance such as e.g. chlorine, a clouding of the fluid, a redox potential of the fluid, a temperature and/or a pressure or any desired other variable, in particular related to the fluid.

The measurement data obtained via the analysis module as a rule supplement the data obtained via the fluid module, wherein the analysis module is usually designed such that variables are determined which are not accessible or are accessible only with difficulty by evaluation of the measurement with surface acoustic waves.

In principle, it is possible to provide module-receiving openings on all sides of the housing (based on the cross section perpendicular to the flow direction), into which one or more fluid-measuring modules and/or one or more analysis modules, optionally designed for different measurement variables, can be inserted depending on the requirements on the fluid meter. The module openings not needed can be covered by reflectors.

The housing can advantageously be produced in one piece in order to avoid additional outlay on assembly and to achieve a high precision. Thus, the housing can be designed as a single-piece body made of a suitable material which comprises the flow channel, the fluid inlet, the fluid outlet, the module-receiving openings and optionally further fluid lines and/or further geometric structures. All of the electronic components of the fluid meter as well as also the waveguides can be provided on the fluid modules inserted into the module openings or possibly also on further separately prefabricated components inserted into the housing. This allows a modular construction in which individual fluid modules and analysis modules on the housing are accessible from the outside and can be exchanged non-destructively.

A recess which has a cable feedthrough to the module-receiving opening and through which electrical and/or electronic connection cables of the respective fluid-measuring module are fed in order to provide an interface for the fluid-measuring module contactable from outside the fluid meter can be provided in the housing.

In a preferred embodiment, a valve is provided, via which a fluid flow through the flow channel can be adjusted, wherein the housing has fluid-guiding channels between the flow channel and the valve and between the valve and the fluid inlet or the fluid outlet. In this way, the valve (formed separately from the housing and the fluid-measuring module) only has to be placed on the housing and can optionally also be exchanged. The fluid connections can be provided completely in the housing. The flow channel and the fluid line can be formed in a solid, single-piece section of the housing. Naturally, the housing can be adapted to the requirements of the system in which the fluid meter is to be used.

The fluid meter, preferably including the valve and control and evaluation electronics as well as all the fluid and/or analysis modules possibly provided, forms a single component, which can be built into a system via the securing structures at the fluid inlet and fluid outlet.

It is also possible to use the fluid meter for flow control, wherein the measured values determined by the fluid and/or analysis modules are taken into account. The control signals for the valve can be provided by a controller which is integrated in the fluid meter or external.

The fluid meter preferably has an electronic interface for data exchange with external systems or for connection to a network. Via the interface, a power supply of the entire fluid meter as well as all the built-in fluid-measuring modules and/or analysis modules can also be realized. This interface can be a separately prefabricated component which is inserted into a receiver formed on the housing from the outside.

The present invention also provides a fluid-measuring module in particular a fluid-measuring module of a fluid meter according to the present invention such as was described above. The fluid-measuring module has a module housing, which has a base section formed as a waveguide for surface acoustic waves, as well as at least one signal transformer connected directly to the base section, which is designed to excite surface acoustic waves in the waveguide and/or to receive surface acoustic waves from the waveguide. The waveguide is designed to be brought into surface contact with a fluid on an outer side facing away from an interior of the module housing. The fluid-measuring module is designed such that it is used, not alone and independently, but always with an above-described housing of the fluid meter. In particular, the base section of the fluid-measuring module does not form a complete flow channel and, after insertion into the housing of the flow meter, realizes only a section of the flow channel of the fluid meter.

The fluid-measuring module can be designed as an independent unit, i.e. all the measuring devices needed for a measurement, such as for instance signal transformer and waveguide, and optionally also further components such as a temperature sensor, can be integrated into the fluid-measuring module, with the result that the fluid-measuring module preferably does not require any measuring devices arranged separately from the fluid-measuring module on the fluid meter for the measurements to be carried out by it. The fluid meter can therefore be flexibly equipped with specific fluid-measuring modules. An exchange of a, for example defective, fluid module in the fluid meter is also conceivable. The fluid-measuring module itself in no case has fluid flowing through it, but is only brought into contact with the fluid on the outer side of the waveguide, with the result that the outer side of the waveguide forms an interface with the fluid and a section of the inner wall of the flow channel. The rest of the areas of the fluid-measuring module have no contact with the fluid.

For the case where only a single signal transformer is provided in the fluid-measuring module, two fluid-measuring modules which interact are advantageously used on one fluid meter. If two signal transformers are provided in a fluid-measuring module, the measurement can also be effected with a single fluid-measuring module.

The signal transformer or transformers is or are preferably formed as piezoelectric transducers, for example interdigital transducers, and in particular are adhered directly to the waveguide. Surface waves can be generated in the waveguide by applying an AC voltage to the signal transformer.

The module housing has, for example, a trough-shaped housing part which is formed by the base section and a circumferential side wall, wherein the at least one signal transformer is arranged inside the trough-shaped housing part. Such a housing part is easy to manufacture precisely, with the result that a secure seal of the module-receiving opening in the housing of the fluid meter is provided by the base section of the module housing. The trough-shaped housing part is preferably formed as a single-piece component, with the result that the base section merges seamlessly into the side wall.

The side wall is advantageously formed so tall that all the electronic components of the fluid-measuring module can be arranged inside the interior enclosed by the side wall.

It is possible for the module housing to consist only of the trough-shaped housing part.

The module housing should be elongate in the direction of the waveguide, which corresponds to the flow direction through the flow channel and the longitudinal direction of the module-receiving opening in the state when installed in the fluid meter.

The signal transformer is advantageously arranged on one of the ends of the waveguide. In order to keep the dimensions of the module housing small, it is favourable if the end of the waveguide also corresponds to the end of the base section. If two signal transformers are provided, these should be arranged on both opposite ends of the waveguide.

The signal transformer can occupy the entire width of the interior of the module housing perpendicular to the longitudinal extent of the waveguide, but in particular can extend at least over the entire width of the flow channel. This makes it possible to acoustically scan the fluid in the complete width of the flow channel. The fluid meter is thus relatively insensitive to an uneven distribution of the flow rate in the flow channel.

Both the base section and the side wall should have a material thickness great enough for the module housing to be intrinsically rigid and for unintentional deformations of the module housing to be ruled out.

The signal transformer can be covered by a damping element, which restricts a propagation of acoustic waves onto the waveguide directly below the signal transformer.

Adjoining the signal transformer, above the waveguide, an area with low damping is preferably provided, which extends over a length of at least one to twenty times the wavelength, preferably five to ten times the wavelength, of the surface waves. This area runs along the propagation direction of the surface waves in the waveguide. This area with low damping can be, for example, an air gap directly above the waveguide. In this area, the waveguide should not be able to butt against another component when a surface wave passes through it, in order to ensure an undisturbed propagation of the surface waves in the waveguide.

It is possible to arrange a temperature sensor, which is in particular attached directly to the waveguide, inside the module housing, with the result that, in addition to the properties which can be detected via the surface acoustic wave measurement, the temperature in the fluid-measuring module is also known, which also represents a measure of the temperature of the fluid flowing through it. Many of the measurement variables are temperature-dependent, with the result that the measurement accuracy can be increased if the temperature inside the fluid meter is known.

The waveguide can have a smaller wall thickness in a first area directly adjoining the signal transformer, which can optionally also extend directly below the signal transformer, than in a second area spaced further apart from the signal transformer. The second area with the greater wall thickness preferably forms a raised area approximately in the centre of the waveguide. If two signal transformers are provided, the second area with the greater wall thickness preferably lies in the centre between the two signal transformers. A first area with smaller wall thickness should then adjoin each of the signal transformers in the direction of the second area with greater wall thickness, which first areas are preferably formed equally long.

It has been found that the energy transfer to the waveguide is decisively influenced by the choice of its wall thickness. In order for less energy to be transferred to the waveguide at a reflection point of the bulk wave, the greater wall thickness existing at the reflection point is chosen differing from the smaller wall thickness which is optimal for the coupling-in and coupling-out in the area of the signal transformer. In this way, the desired reflection at the reflection point or points can be improved, because it is made more difficult there for the acoustic waves to couple into the waveguide, at best this is even prevented entirely. A much longer distance travelled by the bulk wave through the fluid and thus an enlarged measuring area can thus be realized with good signal strength, which is advantageous in particular for the measurement of low fluid flows.

The first area with smaller wall thickness preferably lies below the signal transformer and the area with low damping adjoining this.

The smaller wall thickness is preferably 40 to 60%, preferably 50%, but at most 100% of the wavelength of the surface acoustic wave used for the measurement. With this optimal wall thickness, the surface waves are particularly well coupled into the wall from the transmitter, from where they propagate further into the fluid.

In a preferred design, the greater wall thickness is 20% to 95%, in particular 50%, larger than the smaller wall thickness. It is thus possible to inhibit the coupling of the surface waves into the waveguide by having a greater wall thickness and thus to improve the reflection at the reflection points. The wall thicknesses at both of the distances considered are preferably constant in each case.

If more than two signal transformers are to be used in a fluid-measuring module, two signal transformers are advantageously arranged on a common area with smaller wall thickness.

For protection against environmental influences, the module housing is preferably at least partially filled with a potting compound, which covers the waveguide and the signal transformer or transformers. If an area of low damping is provided above the waveguide, this is naturally kept clear of the potting compound by suitable measures. The potting compound can at least largely fill, e.g., the trough-shaped housing part.

Alternatively, it is also possible to provide a cover, which seals the trough-shaped housing part.

Materials with a high sound velocity of preferably >1800 m/s are advantageous as material both for the housing of the fluid meter and for the module housing of the fluid-measuring module. For example, metals such as stainless steel, brass and copper, but also high-strength plastics have this property.

The fluid-measuring module can comprise evaluation and/or actuation electronics inside the module housing. While all the components needed for the actual measurement are preferably arranged in the fluid-measuring module itself, evaluation and control can also be at least partially undertaken by external electronics units or by a controller of the fluid meter. In every case, the fluid-measuring module should have an electrical interface, via which a voltage supply and a data exchange are possible.

The fluid meter is advantageously designed modular. For this, the fluid meter can comprise a subassembly consisting of a housing and at least one fluid-measuring module separate from the housing, wherein the fluid-measuring module or modules in the subassembly are optionally supplemented by one or more analysis modules and/or reflectors. The housing here is a housing of an above-described fluid meter, while the fluid-measuring module corresponds to one of the above-described fluid-measuring modules. The fluid-measuring module can be inserted into the module-receiving opening such that the base section of the fluid-measuring module forms a section of an inner wall of the flow channel which comes into direct contact with the fluid flowing through it, with the result that surface acoustic waves emitted by the signal transformer can be coupled out of the waveguide and can propagate through the fluid in the flow channel as bulk acoustic waves and/or bulk acoustic waves can be coupled into the waveguide and received by the signal transformer.

Several different aspects can be realized with a fluid meter described above.

For example, a simple flow measurement is possible via one or more fluid-measuring modules inserted into the module-receiving opening(s) of the housing, which detects the flow of the fluid using a measurement method which uses surface acoustic waves.

However, it is also possible to detect further properties of the fluid by means of analysis modules, which are inserted into further module-receiving openings of the housing, provided in addition to the fluid-measuring module or modules.

In yet another aspect, the fluid meter provides the possibility of combining a flow measurement and optionally a measurement of further properties of the fluid with a flow control in that a valve is provided in the fluid meter. In particular, the fluid meter can thus perform a mass flow regulation by means of the measured values, above all if a corresponding controller is integrated into the fluid meter.

DETAILED DESCRIPTION OF THE INVENTION

Figure 1:
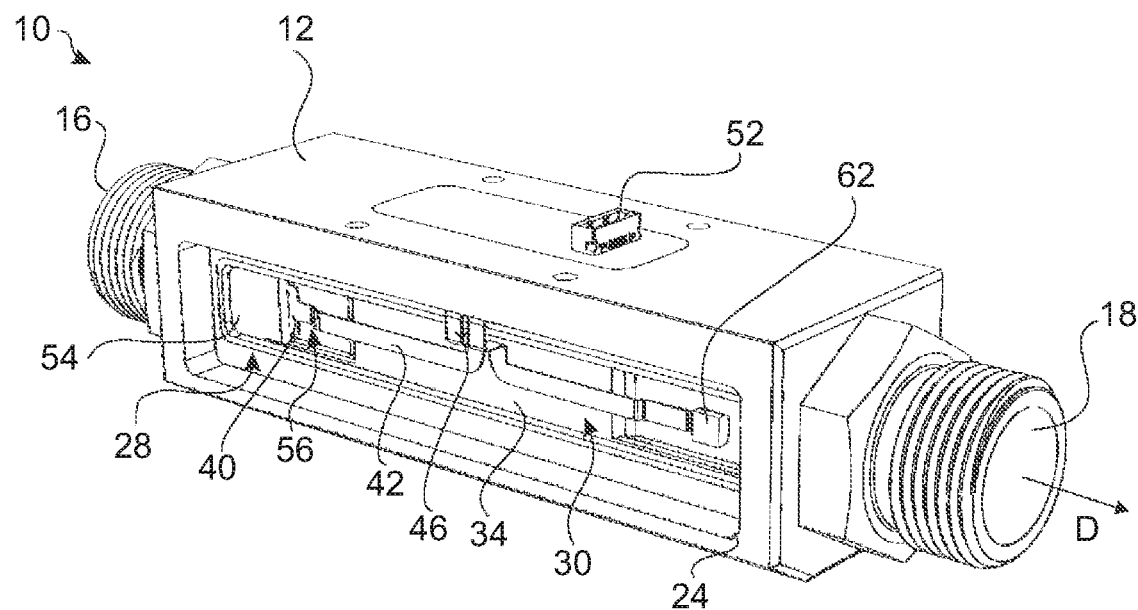
FIG. 1 a schematic perspective representation of a fluid meter according to the invention according to a first embodiment with a fluid-measuring module according to the invention.

FIGS. 1 to 4 show a fluid meter 10 according to a first embodiment.

In an elongate housing 12, a flow channel 14 for a fluid is formed which merges into a fluid inlet 16 at one end of the housing 12 and into a fluid outlet 18 at the other end of the housing 12. Between fluid inlet 16 and fluid outlet 18, the flow channel 14 forms a tube completely closed in a circumferential direction around a flow direction D. The flow channel 14 here forms a measurement section running in a straight line along the flow direction D, wherein the cross-sectional area of the flow channel 14 is constant over its length.

The cross-sectional area of the flow channel 14 in this example, however, is smaller than the cross-sectional area of the fluid inlet 16 as well as than that of the fluid outlet 18. At the transition from the fluid inlet 16 to the flow channel 14 therefore a converging nozzle 20 is provided which increases the flow rate at the entry to the flow channel 14. Accordingly, at the transition of the flow channel 14 to the fluid outlet 18 a diverging nozzle 22 is arranged which reduces the flow rate again after flowing through the flow channel 14. Converging nozzle 20 and diverging nozzle 22 can be formed identical and are designed with as little head loss as possible.

As the housing 12 is constructed substantially symmetrically, fluid inlet 16 and fluid outlet 18 can swap functions. The fluid can thus flow through the flow channel 14 both in the flow direction D from the fluid inlet 16 to the fluid outlet 18 and in the opposite direction.

Figure 3:
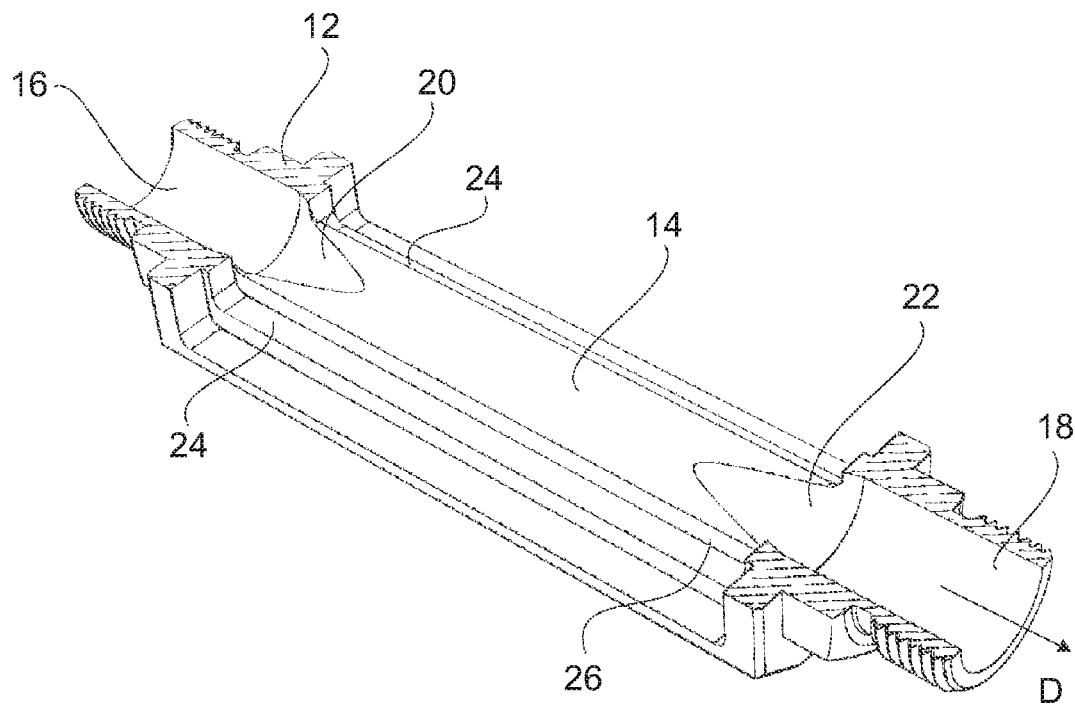
FIG. 3 a housing of the fluid meter from FIG. 1 in the view from FIG. 2 without inserted fluid-measuring modules.
Figure 4:
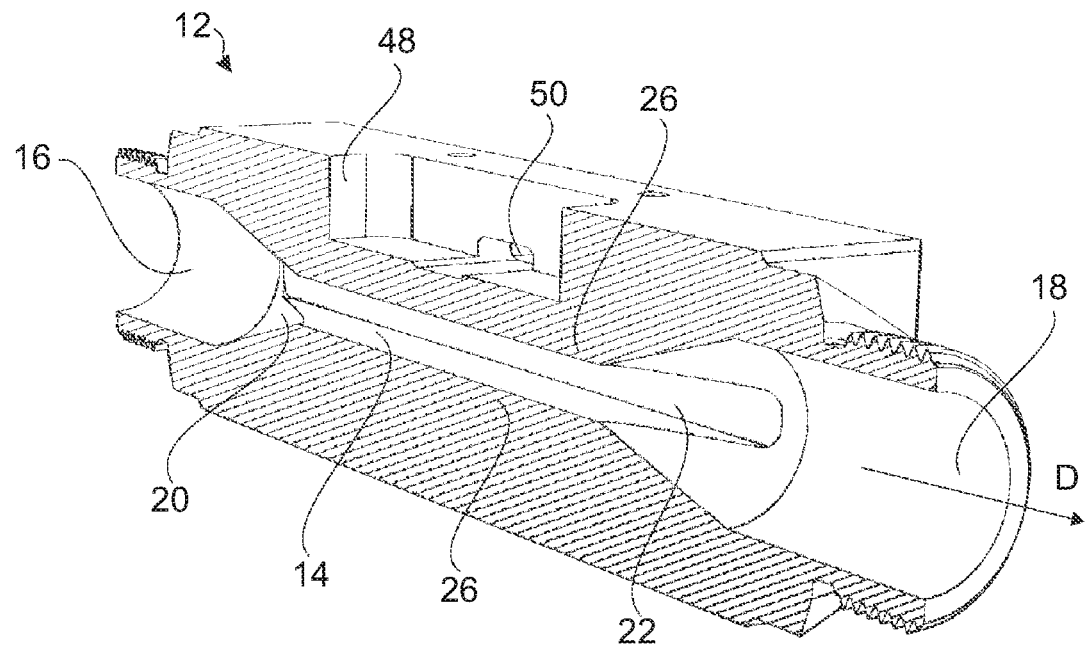
FIG. 4 a schematic sectional view of the fluid meter from FIG. 1 along the flow direction and perpendicular to the sectional direction of FIG. 2.
Figure 10:
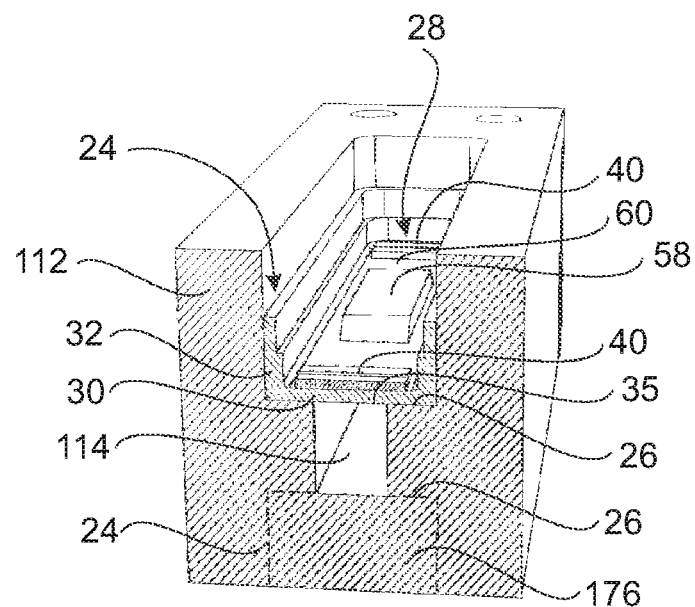
FIG. 10 a schematic sectional view of the fluid meter from FIG. 8 perpendicular to the flow direction.
Figure 11:
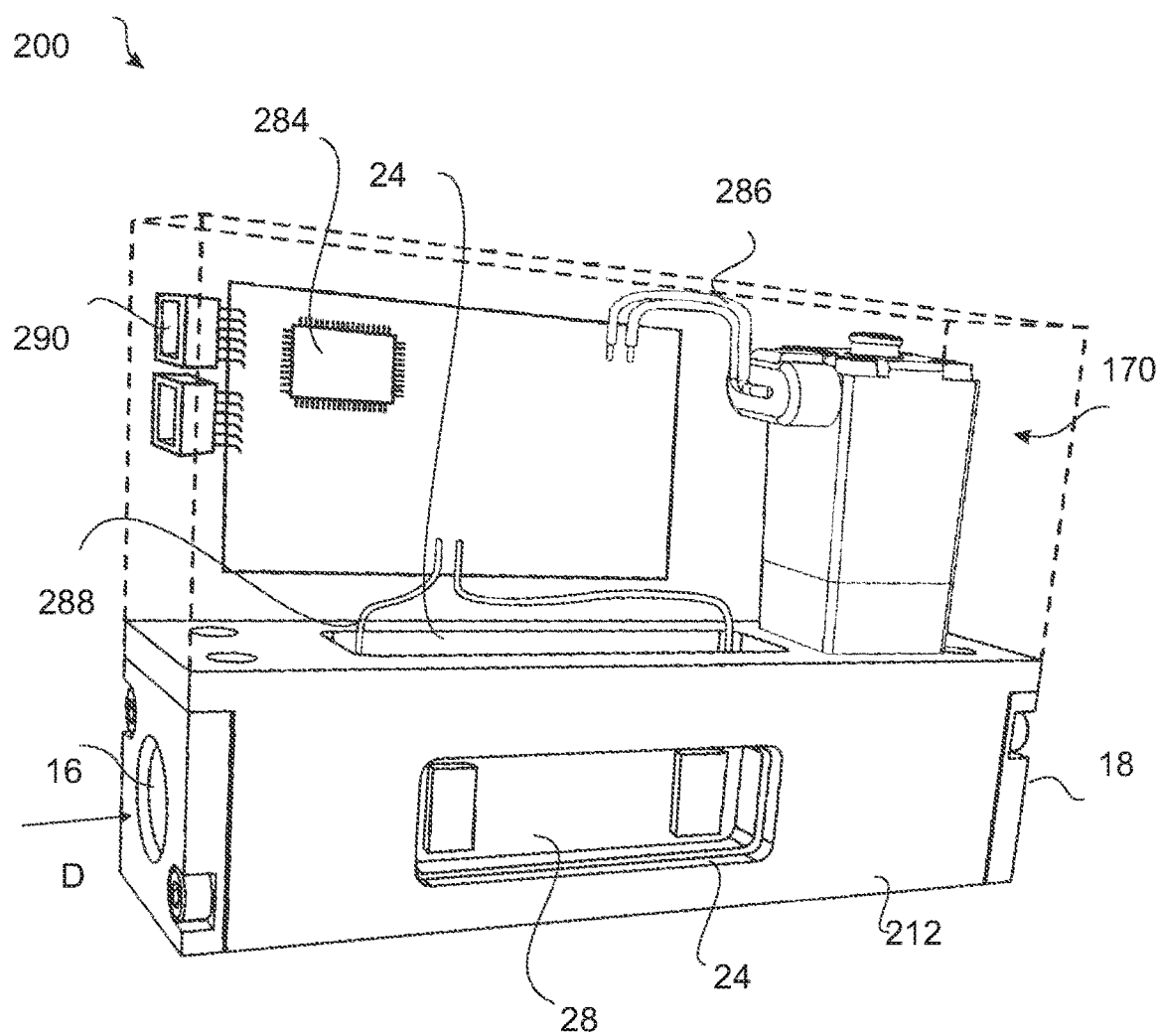
FIG. 11 a schematic perspective representation of a fluid meter according to the invention according to a third embodiment.

In this example, the cross-section shape of the flow channel 14 is chosen to be rectangular (see for example FIGS. 3 and 4 or FIG. 10).

On at least one of the two narrow sides of the rectangle, here on both narrow sides, the wall of the housing 12 is pierced, with the result that a passage from an outer surface 23 of the housing 12 to the flow channel 14 is formed. The passage forms an elongate module-receiving opening 24 which extends over almost the entire length of the flow channel 14 along the flow direction D. This is easily recognizable in FIG. 3.

Perpendicular to the flow direction D and along the narrow side of the cross section of the flow channel 14 the module-receiving opening 24 is a bit wider than the flow channel 14, with the result that a shoulder 26 running on both sides along the flow direction D is formed.

Figure 5:
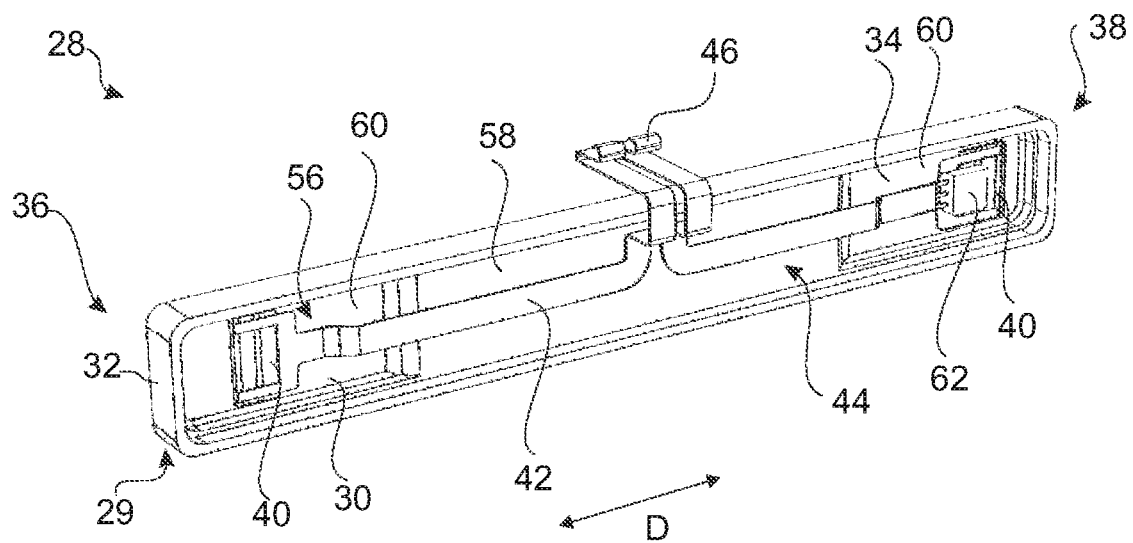
FIG. 5 a schematic perspective representation of a fluid-measuring module according to the invention.
Figure 6:
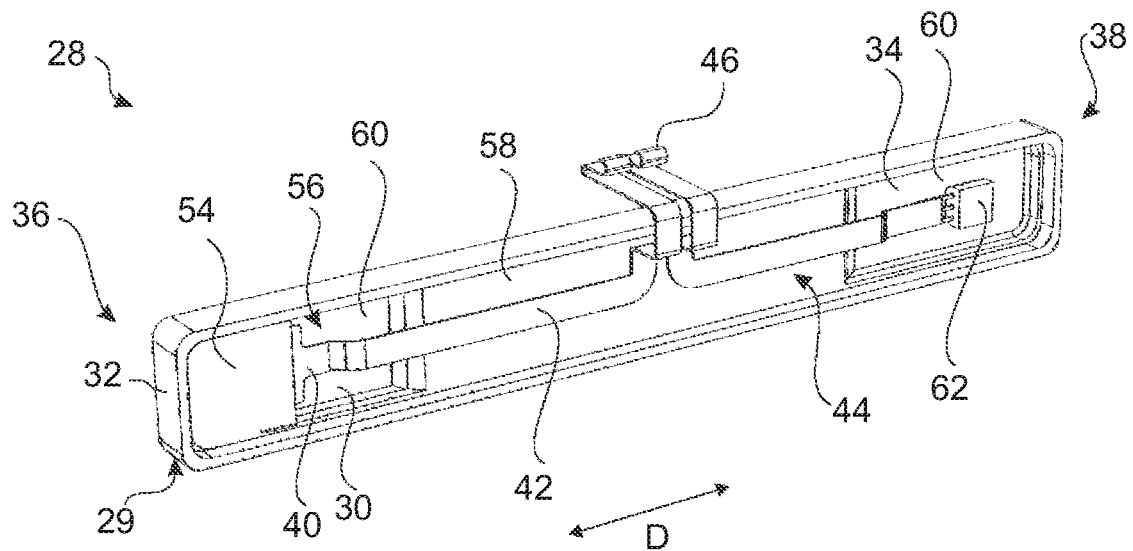
FIG. 6 the fluid-measuring module from FIG. 5 after insertion of a damping element.
Figure 7:
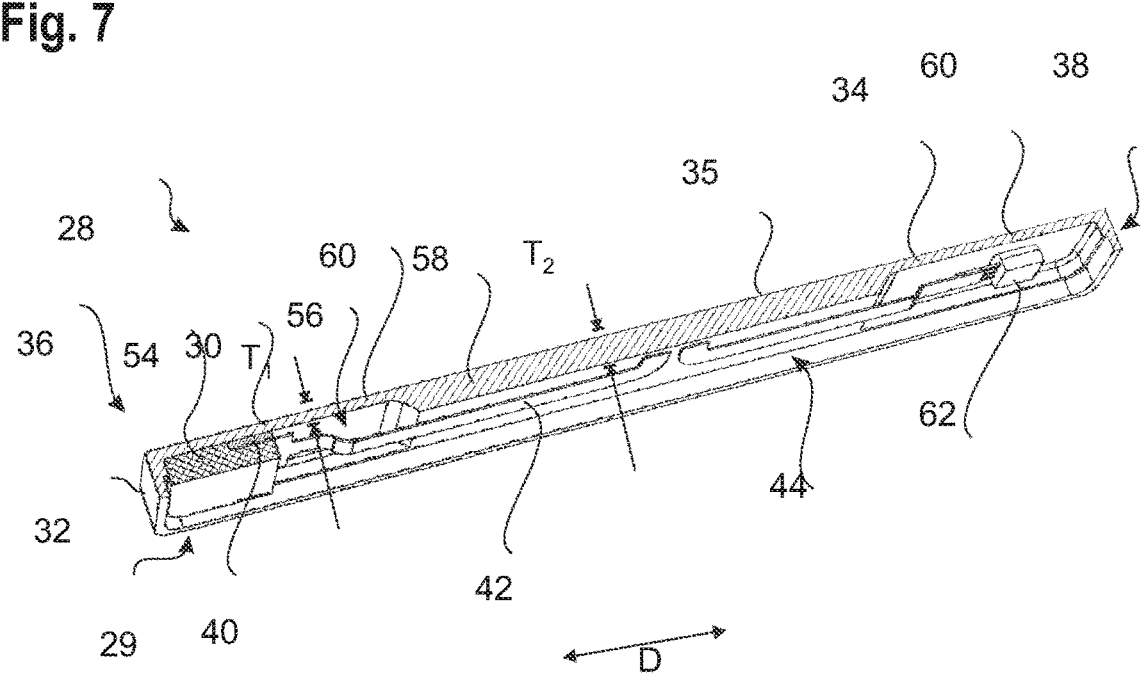
FIG. 7 a schematic sectional view of the fluid-measuring module from FIG. 6 along the flow direction.
Figure 8:
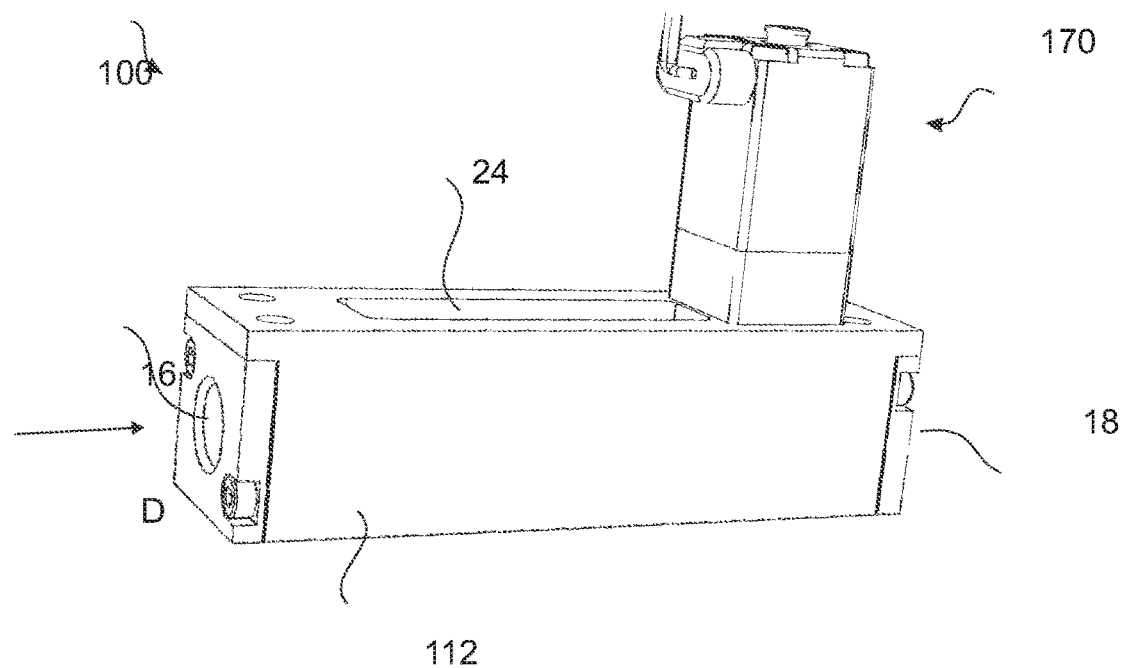
FIG. 8 a schematic perspective representation of a fluid meter according to the invention according to a second embodiment with attached valve.
Figure 9:
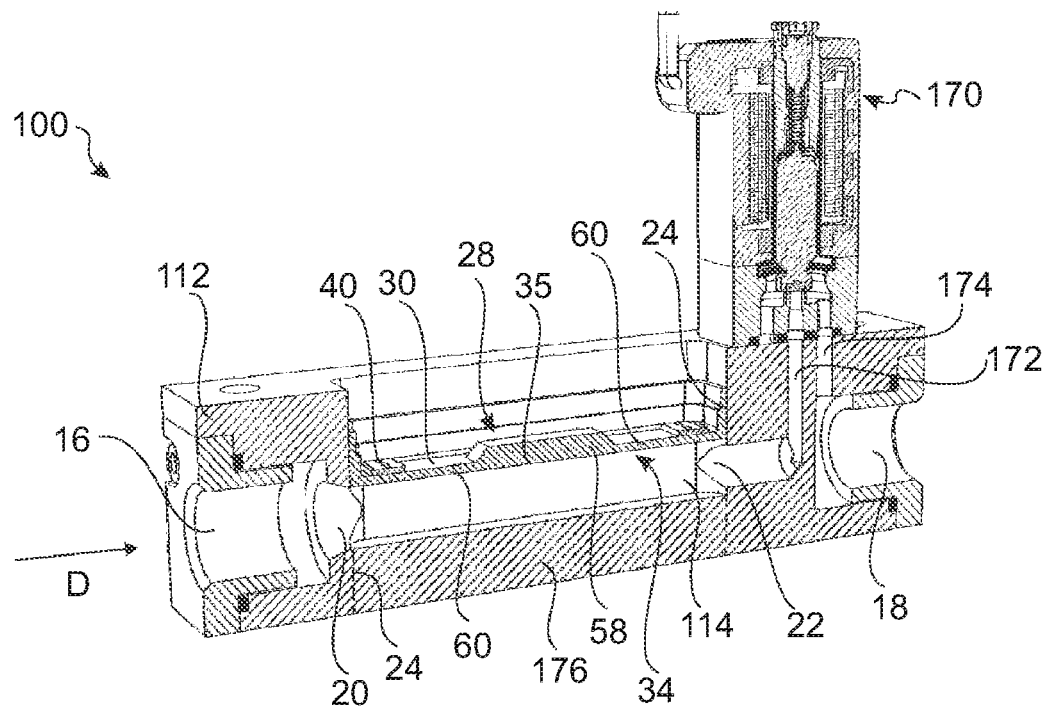
FIG. 9 a schematic sectional view through the fluid meter from FIG. 8 along the flow direction.

A fluid-measuring module 28, which is shown in detail in FIGS. 5 to 7, is inserted into the module-receiving opening 24. The fluid-measuring module 28 is an independent component prefabricated separately from the housing 12 and has a module housing 29 with a base section 30 as well as a side wall 32, running annularly around the base section 30, which merges in one piece and seamlessly into the base section 30. This is easily recognizable in FIG. 7. In this example the module housing 29 consists of a trough-shaped housing part which consists of the base section 30 and the side wall 32.

The base section 30 forms a waveguide 34 for surface acoustic waves. The waveguide 34 extends over the entire length of the base section 30 along the flow direction D and accordingly also over the basic length of the module-receiving opening 24 (minus the thickness of the side wall 32). The flow direction D thus also forms the direction of the longitudinal extent of the fluid-measuring module 28 and is also used in this function in the following for the non-installed fluid-measuring module 28.

The outer side 35 of the waveguide 34 directed towards the flow channel 14 is designed flat in this example. The fluid-measuring module 28 is inserted into the module-receiving opening 24 such that the outer side 35 of the waveguide 34 delimits the flow channel 14, i.e. forms a part of the inner wall of the flow channel 14 and thus represents an interface which comes into direct contact with the fluid flowing through the flow channel 14. The narrow side of the flow channel 14 facing the module-receiving opening 24 is substantially delimited by the waveguide 34.

A signal transformer 40 is arranged in each case on both longitudinal ends 36, 38 (relative to the flow direction D) of the waveguide 34 (see FIG. 5). It would also be possible to provide a signal transformer 40 only on one end 36, 38.

The signal transformer 40 here is a piezoelectric transducer in the form of an interdigital transducer which directly contacts the waveguide 34, with the result that in the transmitter mode surface acoustic waves are excited in the waveguide 34 by the application of an AC voltage to the signal transformer 40. In the receiver mode the signal transformer 40 can receive surface waves from the waveguide 34 and convert them into electrical signals. In this example the signal transformer 40 can function both as transmitter and as receiver, and can also be used alternately as transmitter and as receiver.

The electrical contacting as well as the transmission of the measurement signals or of control signals of the signal transformer or transformers 40 is here effected by flexible circuit boards 42, which are arranged inside the interior 44 of the module housing 29 enclosed by the side wall 32. An interface 46 which is fed out of the module housing 29 is formed on the flexible circuit boards 42.

In the housing 12 of the fluid meter 10 a recess 48, which has a cable feedthrough 50 to the module-receiving opening 24, is provided along the circumferential direction around the flow direction D offset by 90° relative to the module-receiving opening 24 (see FIG. 4). In this example the components forming the interface 46 are fed through the cable feedthrough 50 and electrically connected to a connector module 52 inserted into the recess 48 (see FIG. 1).

In the module housing 29 of the fluid-measuring module 28 a damping element 54, which reduces a propagation of acoustic waves, e.g. undesired reflections, is arranged directly above the signal transformer 40.

Directly adjoining the signal transformer 40 along the flow direction D an area with low damping 56 is formed above the waveguide 34, in that in this example an air gap is provided directly above the waveguide 34. The air gap is chosen to have a height above the waveguide 34 so great that the oscillating waveguide 34 does not come into contact with other components, in particular not with the flexible circuit board 42.

The waveguide 34 in this example has two different wall thicknesses $T_1$, $T_2$ along its longitudinal direction in the flow direction D (see e.g. FIG. 7), which define first and second areas 60, 58 in the waveguide 34. A second area 58 with the larger wall thickness $T_2$ runs approximately in the centre of the waveguide 34 (relative to the flow direction D), while a first area 60 with the smaller wall thickness $T_1$ extends underneath the signal transformer 40 and a bit beyond it in the direction of the area of larger wall thickness $T_2$. The length of the area 60 adjoining the signal transformer 40 corresponds, for example, to five to ten times the wavelength of the surface acoustic waves which are used in known manner for the measurement. The smaller wall thickness $T_1$ is chosen such that a good coupling of surface acoustic waves into the waveguide 34 or a good coupling of surface acoustic waves out of the waveguide 34 is provided. For this, the wall thickness $T_1$ is preferably approximately half the wavelength of the surface waves. The larger wall thickness $T_2$ on the other hand is chosen such that, in the case of a reflection of bulk acoustic waves, surface waves couple into the waveguide 34 as little as possible.

The transition between the areas 58, 60 is designed continuous, thus without steps, in order to rule out undesired reflections of the surface waves along the waveguide 34 as far as possible.

The area with low damping 56 lies above the first area 60 with the smaller wall thickness $T_1$.

Moreover, a temperature sensor 62, which is represented in the area of the right-hand signal transformer 40 in FIG. 5, but can also be arranged at another point and in particular in direct thermal contact with the waveguide 34, is arranged in the interior 44 of the fluid-measuring module 28.

The module housing 29 is filled, for example, with an electrically non-conducting potting compound in order to protect the electrical components of the fluid-measuring module 28 from environmental influences (not shown for representation reasons). The air gap above the area 56 with low damping is naturally left clear.

Figure 2:
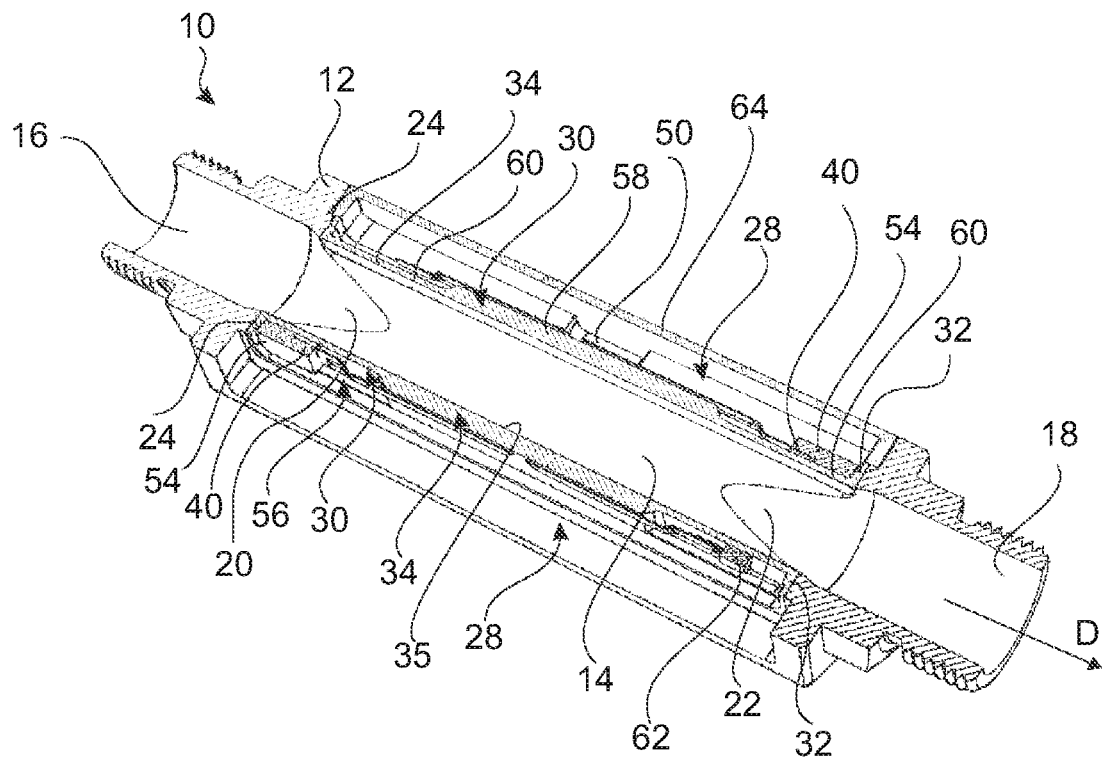
FIG. 2 a schematic sectional view of the fluid meter from FIG. 1 along a flow direction.

Alternatively, as represented in FIG. 2, a cover 64 could be provided which seals the interior 44 of the fluid-measuring module 28.

A subassembly consisting of the housing 12 and the fluid-measuring module 28 forms the main part of the fluid meter 10.

For assembly, the fluid-measuring module 28 is inserted into the module receiver 24 of the housing 12 from the outside as a completely prefabricated unit, with the result that its base section 30 forms a part of the circumferential wall delimiting the flow channel 14.

If the fluid-measuring module 28 is to be exchanged or replaced with another component, e.g. an analysis module yet to be described below or a reflector, then it is accessible from the outer surface 23 and can be removed from the module receiver 24 to the outside.

For the measurement of a fluid, a fluid flow through the flow channel 14 is generated which runs either from the fluid inlet 16 to the fluid outlet 18 or vice versa. In the fluid-measuring module 28 surface acoustic waves in the waveguide 34, which are partially coupled out into the fluid on the outer side 35 of the waveguide 34 directed towards the flow channel 14 and run there as bulk acoustic waves, are excited by one of the signal transformers 40. These bulk acoustic waves are reflected once or more times on the inner wall of the flow channel 14 and, after the reflection, are partially coupled into the same or another waveguide 34 again. There, they are detected by a signal transformer 40 functioning as receiver and converted into electrical signals.

The surface acoustic waves run from the signal transformer 40 acting as transmitter along the flow direction D or also counter to the flow direction D to the second signal transformer 40, which then acts as receiver.

The desired properties of the fluid are determined by e.g. a transit time measurement between the emitted surface acoustic waves and the received surface acoustic waves in evaluation electronics, which can be formed either in the fluid-measuring module 28 or as an external unit.

The two signal transformers 40 can be arranged either in the same fluid-measuring module 28 or in different fluid-measuring modules 28, the only important thing is that a transmitter and at least one receiver are always ready, wherein the roles of the transmitter and of the receiver can be distributed to the individual signal transformers 40 as desired and also varying over time.

FIGS. 7 to 10 show a second embodiment of the fluid meter 100.

The already introduced reference numbers are retained for the same or only slightly altered components, for the sake of clarity.

In this embodiment a valve 170, which is attached to the outside of the elongate housing 112 at right angles to the flow channel 114, is integrated into the fluid meter 100.

The flow channel 114 in this example is formed not in a straight line continuously between the fluid inlet 16 and the fluid outlet 18. Instead, the fluid inlet 16 leads to an outer surface of the housing 112 via a first fluid-guiding channel 172, while the fluid outlet 18 merges into a second fluid-guiding channel 174, which likewise leads to the surface of the housing 112 and its mouth lies next to a mouth of the first fluid-guiding channel 172.

The fluid inlet and outlet of the valve 170 are fluidically connected to the mouths of the two fluid-guiding channels 172, 174, with the result that the valve 170 can regulate the flow through the flow channel 114 by influencing a fluid flow between the two fluid-guiding channels 172, 174.

Of course, as described for the first embodiment, the fluid inlet 16 and the fluid outlet 18 can swap functions, with the result that the flow channel 114 and the fluid-guiding channels 172, 174 can also be flowed through in the reverse direction.

In this example, a diverging nozzle 22 (which acts as a converging nozzle in the reverse flow direction) is arranged between the first fluid-guiding channel 172 and the flow channel 114.

Also in this embodiment two module-receiving openings 24 arranged on opposite narrow sides of the flow channel 114 are provided.

However, here a fluid-measuring module 28 is inserted only into the module-receiving opening 24 at the top in the figures, while the module-receiving opening 24 at the bottom in the figures is sealed in a fluid-tight manner by a blind cover 176 acting only as a reflector for the bulk acoustic waves.

The fluid-measuring module 28 in this case has two signal transformers 40, with the result that the measurement of the fluid can be carried out via surface acoustic waves completely by this one fluid-measuring module 28.

Of course, a fluid-measuring module 28 or also another measuring module could also be inserted into the second module-receiving opening 24.

The measurement principle is as described in the first embodiment, with the single difference that the fluid flow through the flow channel 114 can be adjusted via the valve 170 from a maximum flow to a complete interruption of the fluid flow.

FIGS. 11 to 17 show a third embodiment of the fluid meter 200.

The structure of the fluid meter 200 is similar to that of the fluid meter 100 just described of the second embodiment. Here too, a housing 212 is provided with a flow channel 114 (see e.g. FIG. 12), through which a fluid can flow. A valve 170 is fitted onto the housing 212, wherein its connections here are implemented, analogously to the second embodiment, by fluid-guiding channels 172, 174 in the housing 212.

In this example, a module-receiving opening 24 is provided in each case on every side of the flow channel 114 with a rectangular cross section. As a rule, only one or two of these module-receiving openings 24, in particular module-receiving openings 24 lying opposite each other, are provided with fluid-measuring modules 28.

However, an analysis module 280 (see FIG. 13) is inserted into at least one of the remaining further module-receiving openings 24. The analysis module 280 is optionally constructed similarly to the fluid-measuring module 28 and comprises a module housing 229, which consists of a trough-shaped housing part, the base section of which faces the flow channel in the state when inserted. The respective measuring devices, which are determined by the respective type of the analysis module 280, are received in this module housing 229. The module housing 229 here is at least partially filled with a potting compound in order to protect the measuring devices from environmental influences.

The insertion of the analysis module 280 can be done in the same way as the insertion of the fluid-measuring module 28. In particular, a measurement side 282, which forms an outer side of the base section, points towards the inside of the flow channel 14, with the result that the fluid flowing through it comes into contact with the measurement side 282, which then delimits the flow channel 114, analogously to the fluid-measuring module 28.

Figure 14:
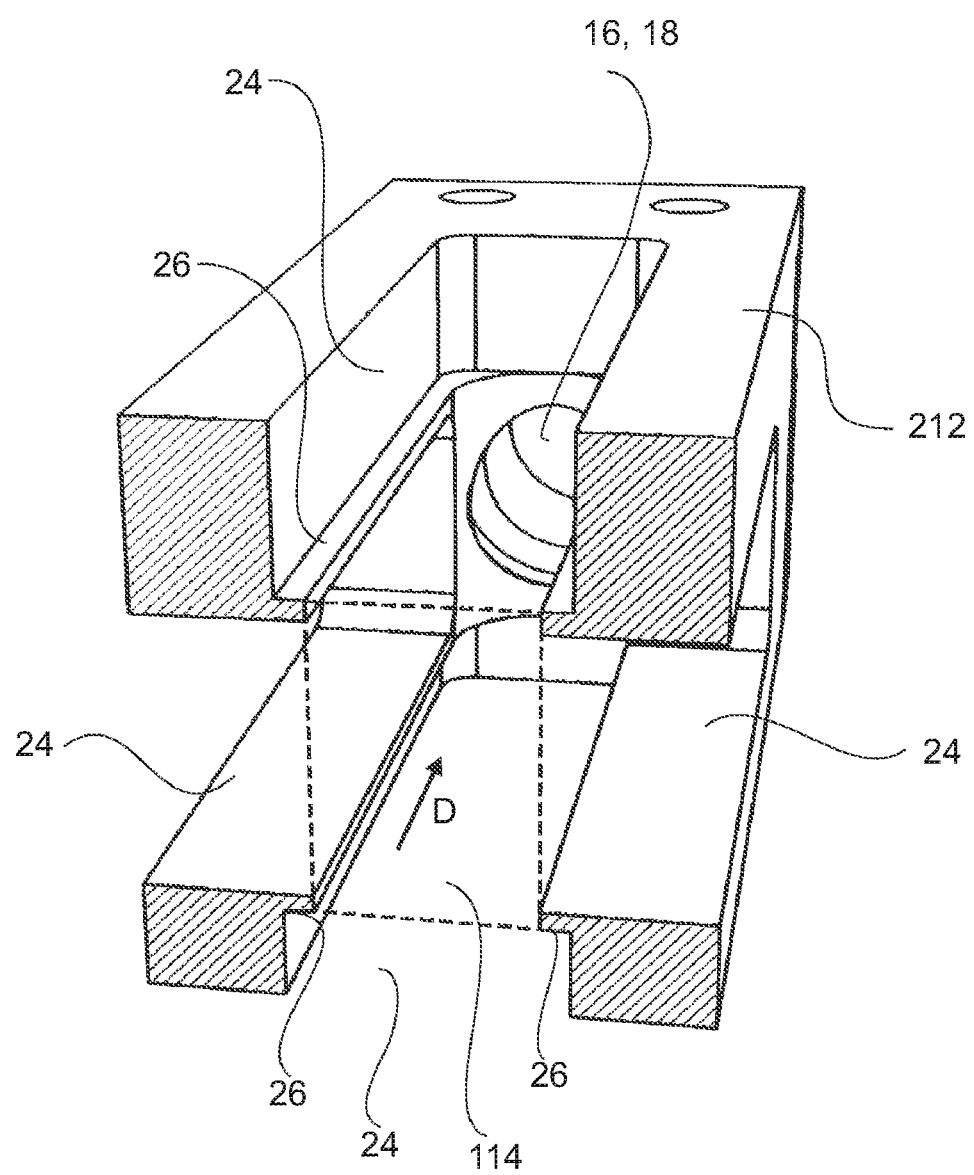
FIG. 14 a perspective sectional view of a housing of the fluid meter from FIG. 11 perpendicular to the flow direction, and FIGS. 15 to 17 different cross-section shapes of the flow channel of a fluid meter according to the invention.

The module-receiving opening 24 has, for example, analogously to the first embodiment, shoulders 26, on which the measurement side 282 of the analysis module 280 can bear (see FIG. 14).

The analysis module 280 can be designed to measure any desired property of the fluid or environmental conditions. For example, it is a possibility to measure an electrical conductivity, a pH, a concentration of a chemical substance, a clouding of the fluid, a redox potential of the fluid, a temperature and/or a pressure. For this, e.g. one or more suitable measuring elements 283 are built into the analysis module 280 such that they come into contact with the fluid.

In this way, the fluid meter 200 can be designed as an analysis device for a plurality of fluid properties, wherein with an identical housing 212 the individual module-receiving openings 24 can be equipped differently depending on the intended use.

Module-receiving openings 24 not needed are, as in the second embodiment, sealed by blind covers 176, which serve in particular as reflectors for acoustic waves.

The fluid meter 200 has a controller 284 (see FIG. 11), which is connected to the valve 170 via control lines 286 and to the individual fluid-measuring modules 28 as well as the individual analysis modules 280 via control lines 288. Moreover, the control unit 284 can communicate with external units or a network via suitable electronic interfaces 290, for example a bus system. For example, the fluid meter 200 can be integrated with respect to the control into a complete system via the interface 290.

The interface 290 here also comprises an outlet, via which control signals can be output e.g. to external actuators, with the result that the fluid meter 200 can also fulfil a complex process control in a system. For example, a chlorine content could be monitored in a water treatment system, wherein the fluid meter 200 actuates external actuators (e.g. valves), via which fresh water or chlorine can be metered in appropriately.

The fluid meter 200 thus represents a complete, independent measuring unit which can be inserted via the fluid inlet 16, the fluid outlet 18 into a fluid-guiding system.

It is possible to operate the fluid meter 200 e.g. as a mass flow regulating unit, in that the valve 170 adjusts the flow through the flow channel 114 depending on the values detected by means of the fluid-measuring module(s) 28 as well as the analysis module(s) 280.

Figure 12:
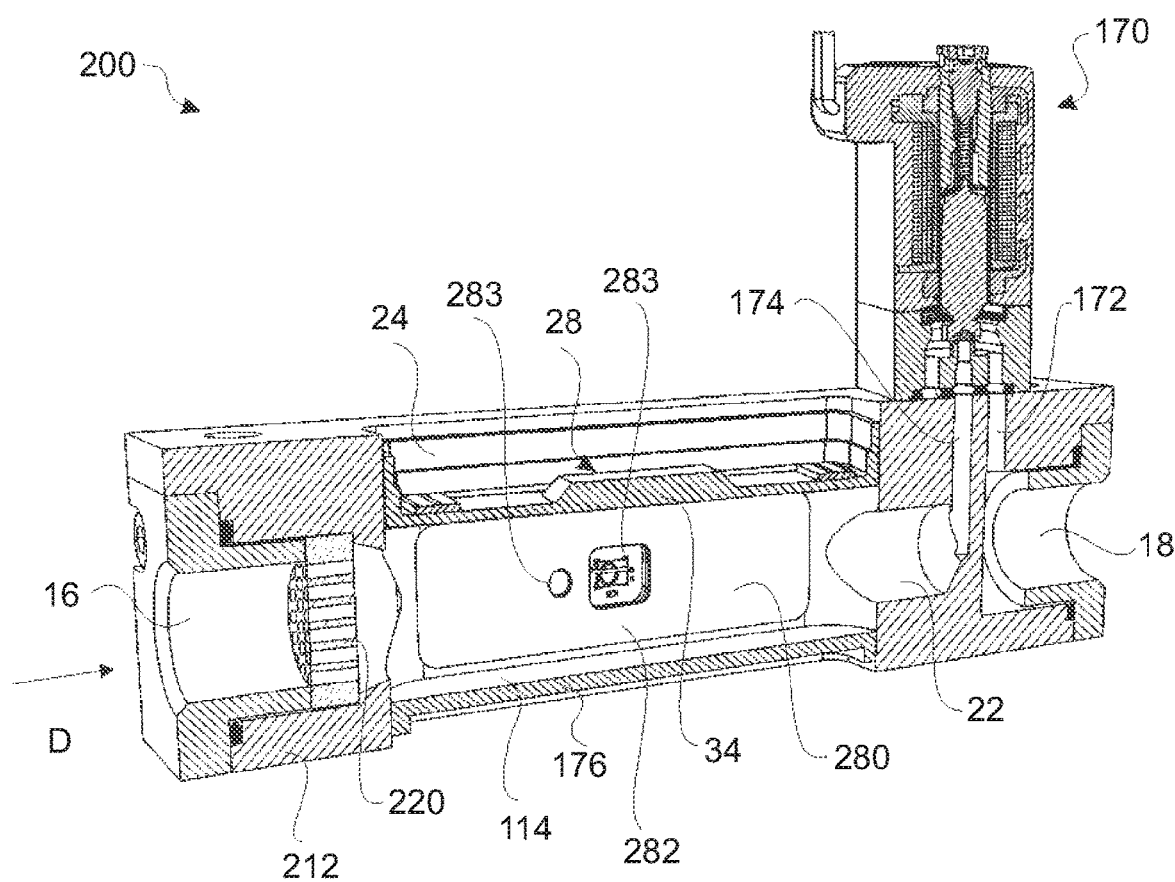
FIG. 12 a schematic sectional view of the fluid meter from FIG. 11.
Figure 13:
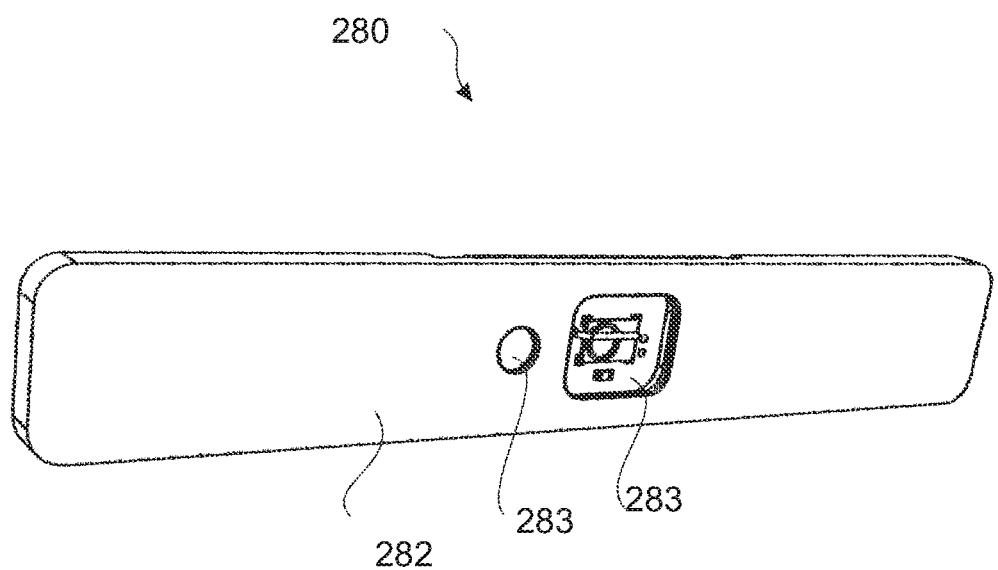
FIG. 13 a schematic representation of an analysis module for a fluid meter from FIG. 11.

In the example shown here the flow direction D from the fluid inlet 16 to the fluid outlet 18 is chosen. At the transition from the fluid inlet 16 to the flow channel 114, a flow-conditioning element 220 is arranged here, which ensures a more uniform flow through the flow channel 114, in particular if the cross section of the fluid inlet 16 is round and that of the flow channel 114 is polygonal. The flow-conditioning element 220 is for example a plate with a plurality of parallel fluid apertures, as is indicated in FIG. 12.

In addition to the rectangular cross-section shapes of the flow channel 114 represented in FIGS. 11 to 14 with four module-receiving openings 24 formed on the sides, other polygonal cross-section shapes are also conceivable, for example hexagonal or octagonal cross sections, as are represented in FIGS. 16 and 17. In this case, a module-receiving opening 24, into which in each case a fluid-measuring module 28, an analysis module 280 or a blind cover 176 can be inserted, can be formed on each of the flat sides of the housing 212. Of course, it is possible to provide different analysis modules 280 for the measurement of different properties.

The features of the individual embodiments can of course be freely combined with each other or swapped with each other at the discretion of a person skilled in the art.

The invention claimed is:

1. A subassembly consisting of a housing, in which a flow channel for a fluid to be measured is formed, that has a polygonal cross section, as well as one elongate module-receiving opening formed in each of the sides of the flow channel, which forms a passage from an outer surface of the housing to the flow channel, wherein the module-receiving openings are aligned along the flow channel, and at least one fluid-measuring module, at least one analysis module and at least one blind cover without any signal transformers and serving as a reflector for acoustic waves, each being separate from the housing, the fluid-measuring module comprising a module housing, which has a base section formed as a waveguide for surface acoustic waves, as well as at least one signal transformer, in the form of an interdigital transducer, connected directly to the base section, which is designed to excite surface acoustic waves in the waveguide and/or to receive surface acoustic waves from the waveguide, wherein the waveguide is designed to be brought into surface contact with a fluid on an outer side facing away from an interior of the module housing, and the analysis module being designed to measure at least one of an electrical conductivity, a pH, a concentration of a chemical substance, a clouding of the fluid, a redox potential of the fluid, a temperature, and a pressure, wherein the fluid-measuring module, the analysis module and the blind cover can be inserted into the module-receiving openings, any module-receiving openings where neither fluid-measuring modules nor analysis module are arranged being sealed by a blind cover, the fluid-measuring module being inserted such that the base section of the fluid-measuring module forms a section of an inner wall of the flow channel, which comes into direct contact with the fluid flowing through it, with a result that surface acoustic waves emitted by the signal transformer can be coupled out of the waveguide and can propagate through the fluid in the flow channel as bulk acoustic waves and/or bulk acoustic waves can be coupled into the waveguide and received by the signal transformer.

2. The subassembly according to claim 1, wherein the base section of the fluid-measuring module is formed flat on its outer side facing the flow channel.

3. The subassembly according to claim 1, wherein the flow channel is delimited by a fluid inlet and by a fluid outlet and in that a converging nozzle is provided at the fluid inlet and/or a diverging nozzle is provided at the fluid outlet.

4. The subassembly according to claim 3, wherein a valve is provided, via which a fluid flow through the flow channel can be adjusted, wherein the housing has fluid-guiding channels between the flow channel and the valve and between the valve and the fluid inlet or the fluid outlet.

5. The subassembly according to claim 1, wherein a recess, which has a cable feedthrough to the module-receiving opening and through which electrical and/or electronic connection cables of the fluid-measuring module are fed, is provided in the housing.

6. The subassembly according to claim 1, wherein the flow channel has a hexagonal or an octagonal cross section.

7. The subassembly according to claim 1, wherein the signal transformer is arranged on a surface of the waveguide that extends parallel to a flat outer side of the waveguide that is directed towards the flow channel.

8. A fluid meter with a housing, in which a flow channel for a fluid to be measured as well as at least one elongate module-receiving opening, which forms a passage from an outer surface of the housing to the flow channel, are formed, wherein the module-receiving opening is aligned along the flow channel, and with at least one fluid-measuring module, prefabricated separately from the housing, which has a base section formed as a waveguide for surface acoustic waves, as well as at least one signal transformer in form of an interdigital transducer, which is designed to excite surface acoustic waves in the waveguide and/or to receive surface acoustic waves from the waveguide, wherein the fluid-measuring module is inserted into the module-receiving opening such that the base section of the fluid-measuring module forms a section of an inner wall of the flow channel, which comes into direct contact with the fluid flowing through it, with a result that surface acoustic waves emitted by the signal transformer can be coupled out of the waveguide and can propagate through the fluid in the flow channel as bulk acoustic waves and/or bulk acoustic waves can be coupled into the waveguide and received by the signal transformer, wherein at least one further module-receiving opening is provided in the housing, into which a blind cover without any signal transformer and serving as a reflector for acoustic waves is inserted.

9. The fluid meter according to claim 8, wherein the flow channel is closed in a circumferential direction around a flow direction and has a polygonal cross section in an area of the module-receiving opening.

10. The fluid meter according to claim 8, wherein at least one further module-receiving opening is provided in the housing.

11. The fluid meter according to claim 10, wherein an analysis module is inserted into the further module-receiving opening.

12. The fluid meter according to claim 11, wherein the analysis module is designed to measure at least one of an electrical conductivity, a pH, a concentration of a chemical substance, a clouding of the fluid, a redox potential of the fluid, a temperature and a pressure.

13. The fluid meter according to claim 10, wherein a second fluid-measuring module is inserted into the further module-receiving opening.

14. The fluid meter according to claim 8, wherein the flow channel has a hexagonal or an octagonal cross section.

15. The fluid meter according to claim 8, wherein the signal transformer is arranged on a surface of the waveguide that extends parallel to a flat outer side of the waveguide that is directed towards the flow channel.

16. The fluid meter according to claim 8, wherein the base section of the fluid-measuring module is formed flat on its outer side facing the flow channel.

17. The fluid meter according to claim 8, wherein the flow channel is delimited by a fluid inlet and by a fluid outlet and in that a converging nozzle is provided at the fluid inlet and/or a diverging nozzle is provided at the fluid outlet.

18. The fluid meter according to claim 8, wherein a recess, which has a cable feedthrough to the module-receiving opening and through which electrical and/or electronic connection cables of the fluid-measuring module are fed, is provided in the housing.

* * * * *